(12) United States Patent
Chilvers

(10) Patent No.: US 8,450,879 B2
(45) Date of Patent: May 28, 2013

(54) POWER CONTROL APPARATUS

(76) Inventor: Graham Chilvers, Troquay (GB)

( * ) Notice: Subject to any disclaimer, the term of this patent is extended or adjusted under 35 U.S.C. 154(b) by 500 days.

(21) Appl. No.: 12/679,927

(22) PCT Filed: Sep. 28, 2008

(86) PCT No.: PCT/GB2008/003290
§ 371 (c)(1),
(2), (4) Date: Mar. 25, 2010

(87) PCT Pub. No.: WO2009/040554
PCT Pub. Date: Apr. 2, 2009

(65) Prior Publication Data
US 2010/0201206 A1    Aug. 12, 2010

(30) Foreign Application Priority Data

Sep. 28, 2007  (GB) .................................. 0718911.1
Jun. 10, 2008  (GB) .................................. 0810574.4

(51) Int. Cl.
*H01H 83/00*  (2006.01)
(52) U.S. Cl.
USPC .............. 307/116; 361/42; 340/531; 307/117
(58) Field of Classification Search
USPC ................ 307/116; 361/42, 118; 340/153
See application file for complete search history.

(56) References Cited

U.S. PATENT DOCUMENTS

| | | | |
|---|---|---|---|
| 3,234,536 A * | 2/1966 | Grant, Jr. et al. | 340/512 |
| 3,860,919 A * | 1/1975 | Aker | 340/527 |
| 3,872,355 A * | 3/1975 | Klein et al. | 361/45 |
| 4,728,935 A * | 3/1988 | Pantus et al. | 340/506 |
| 4,979,070 A * | 12/1990 | Bodkin | 361/42 |
| 5,508,568 A | 4/1996 | Mammen | |
| 6,262,871 B1 * | 7/2001 | Nemir et al. | 361/42 |
| 7,253,629 B1 * | 8/2007 | Richards et al. | 324/424 |
| 2005/0151663 A1 * | 7/2005 | Tanguay | 340/691.2 |
| 2006/0044133 A1 * | 3/2006 | Lou | 340/531 |
| 2006/0209483 A1 * | 9/2006 | Hurwicz | 361/115 |
| 2007/0195470 A1 * | 8/2007 | Zhang et al. | 361/42 |
| 2009/0063064 A1 * | 3/2009 | Jackson | 702/58 |

FOREIGN PATENT DOCUMENTS

| | | |
|---|---|---|
| GB | 2438252 A | 11/2007 |
| WO | WO 99/52090 | 10/1999 |

* cited by examiner

*Primary Examiner* — Jared Fureman
*Assistant Examiner* — Alfonso Perez Borroto
(74) *Attorney, Agent, or Firm* — Gordon & Jacobson, PC

(57) ABSTRACT

A power control apparatus comprises a transducer having an output (12,13) which is connected to a remotely activated device (25) mounted in a mains consumer unit (14). When a predefined parameter is detected, the device (25) is activated to connect a load (29) between the switched live output (18) of a residual current device RCD (15) and the neutral input (17) thereof, thereby creating an imbalanced current flow on the live and neutral output terminals (18,19) of the RCD (15) which causes contacts (20,21) inside the RCD (15) to disconnect the supply to an appliance circuit (22).

25 Claims, 4 Drawing Sheets

POWER CONTROL APPARATUS

BACKGROUND OF THE INVENTION

1. Field of the Invention

This invention relates to a power control apparatus.

2. Related Background Art

Many fires are caused by faulty electrical wiring or by electrical appliances malfunctioning or overheating. Many fires are also caused by overheating liquids and solids (such as food and drink), which are being heated or cooked using a cooking appliance. Generally, before a fire starts, the source of the fire normally emits smoke. This smoke can be detected by a fire alarm system or smoke detector(s) to warn the occupants of a building that smoke has been detected. The occupants may take remedial action upon hearing the alarm to address the cause of smoke before a fire starts, for example by switching off the appliance or unplugging the electrical appliance or by removing the source of heat from a liquid or solid which is being heated or cooked.

Known fire alarm systems save property and many lives. A great deal of properties are still needlessly damaged or lost to fire. Many people are also injured or killed. A large number of fires either occur because the building is empty and a smouldering fire has the opportunity to take hold, or because the occupant(s) simply leave the building when an alarm occurs. Sometimes occupants are incapable of taking action at the time because, for example, they are asleep, overcome with fumes, too young, panicked, trapped, disabled or affected by drugs or alcohol. In this manner, a great deal of properties are needlessly damaged or lost to fire. Many people are also injured or killed. Some people are injured or killed attempting to stop the outbreak or spread of fire.

Most fires are extinguished using water and a problem with this is that it can be dangerous to extinguish fires using water, since water is a conductor of electricity, thus Firemen run the risk of electrocution.

AU2003200895 discloses a fire prevention apparatus which attempts to alleviate the above-mentioned problems and which comprises a smoke sensor having an output which is connected to a switch of the apparatus. The switch is wired in series with the mains supply which feeds electrical appliances. In use, an electromagnetic coil keeps the switch contacts closed to allow the appliances to function in the usual manner.

Upon detection of fire, the smoke sensor sends a signal to the switch to energise or de-energise the coil the result of which is that the switch contacts open, such that the electrical appliances are isolated from the supply. A disadvantage of the above-mentioned apparatus is that the switch needs to have contacts of a suitably high current rating to handle the current drawn by the appliances. Furthermore, the switching circuit is expensive in construction and occupies a physical space. Also, the apparatus is costly to run since the electromagnetic coil is normally energised. There is also a risk that the coil could overheat and start a fire.

I have now devised a power control apparatus which alleviates the above-mentioned problems.

SUMMARY OF THE INVENTION

In accordance with the present invention, there is provided a power control apparatus comprising:

a transducer, operable to detect a predefined parameter and generate an activation signal in response to said detection;

a switching device comprising an electrical input for connecting to an electrical supply, an electrical output for connecting to one or more electrical appliances or circuits, a switch connected between said electrical input and said electrical output, and fault sensing means arranged to actuate the switch to disconnect the electrical input from the electrical output when a fault is detected in the electrical supply drawn from the switching device by said appliance(s) or circuits from said electrical output; and fault simulation means, remote from said transducer, arranged to simulate a fault in the supply drawn from said electrical output of said switching device in response to receiving said activation signal from said transducer, so as to cause said fault sensing means to actuate the switch to disconnect the electrical input from the electrical output.

Where the appliance is running on gas, in many cases these appliances have electrically operated controls, like timers, flame out detection and thermostats arranged to operate so that removing the electrical supply to the appliance will turn off the gas supply. If the gas appliance isn't so arranged, the simple addition of an electrically operated gas shut off that turns off the gas supply when the electrical supply to the appliance is removed, will bring it under the protection of the remotely activated fault simulation means.

Mains distribution circuits in most buildings and dwellings are protected by at least one switching device of the above-mentioned type, so that the electrical mains supply can be disconnected in the event that a fault is detected in the electrical supply drawn there from: such a fault may for example signify that an appliance is faulty, that the wiring is faulty, or that an event or accident has occurred involving an appliance or the wiring thereto: examples of such events or accidents may include a user cutting or damaging a cable, or immersing or wetting an appliance.

It will be appreciated that the use of a conventional switching device to switch the supply to the appliance(s) avoids the need to provide any expensive additional contacts. Accordingly, the contacts will already be of a suitably high current rating to handle the current drawn by the appliances. A fire prevention apparatus in accordance with the present invention is thus inexpensive in construction since it utilises off-the-shelf switching devices of the kind which are generally utilised in most domestic and industrial mains supply circuits, to carry the electrical load and perform the actual switching.

The switching device may comprise an earth leakage trip switch or so-called ELCB, a residual current circuit breaker or so-called RCCB, or a residual current device or so-called RCD, arranged to disconnect the electrical input from the electrical output when an imbalance is detected in the current flowing along a pair of wires across which the or each appliance is connected. Accordingly, when the transducer is operated, the remotely activated fault simulation means imbalances the current and thereby actuates the device to disconnect the supply to the appliance(s). RCDs, RCBOs are also known as ground fault circuit interrupters or GFCIs and are generally required by law to be fitted in dwellings when the dwellings are constructed or rewired.

The switching device may alternatively comprise a combined residual current device and circuit breaker, such as a so-called RCBO.

The electrical input of the switching device comprises first and second input terminals respectively connected to first and second output terminals of the electrical output, said switch being disposed between the first terminals at least, wherein said fault simulation means is arranged to connect a load between the first output terminal and the second input terminal or vice-versa, in this manner an imbalance is created between the current flowing through the output terminals: this imbalance is detected by the fault sensing means which actuates the switch to disconnect the electrical input from the electrical output.

The transducer may comprise a heat sensor and/or a smoke sensor and/or a carbon monoxide detector and/or a carbon dioxide detector and/or a movement detector. Alternatively, the transducer may comprise a manual call point or switch which can be operated by a user in the event of an emergency. The transducer is located remote from the fault simulation means and may be connected to the fault simulation means via an alarm control panel. Either the transducer or the alarm control panel may send a signal to the fault simulation means by means of a solid cable connection, radio signal, specific sound or a modulated signal on the electrical main circuit supplying the fault simulation means.

Preferably the first and second input terminals are respectively arranged for connecting to the live and neutral of a mains supply.

Said fault simulation means may be arranged to simulate a fault in the supply drawn from said electrical output of said switching device a predetermined time period after said transducer is operated. The period can be set for example, to allow a person time to burst test the alarm or take action to remove the cause of the activation once the transducer has been activated before the switching device is actuated to disconnect the supply to the appliance(s).

The switching device and the fault simulation means can be separate to or mounted inside a unit such as a so-called consumer unit or power distribution panel arranged to distribute an electrical supply to one or more appliance circuits via respective switching devices. Alternatively, the fault simulation means can be provided as a single unit separated by a distance from the switching device. In this case, the fault simulation means would again, operate by creating a minor imbalance on the electrical supply through the switching device. It may do this by placing a small load between earth and the live connection of the supply at any point along that supply For example, the fault stimulation means could be contained in a box that is plugged in a wall socket. It could detect an output from a nearby transducer by audio means or radio signal and in response place a small imbalance on the supply at that socket, thus causing the switching device which is located a remote distance from the fault simulation means (e.g. back at the distribution board) to operate and isolate that complete circuit.

An electrical distribution board may comprise a plurality of switching devices mounted inside a unit feeding respective appliance circuits, and said fault simulation means may be arranged to simulate a fault in the supply drawn from the electrical output of at least one of said switching devices. In the case where a plurality of switching devices are controlled by said fault simulation means, said fault simulation means may be arranged to simulate a fault in the supply drawn from the respective electrical outputs of each switching device at different predetermined time periods after said transducer output signal is detected. In this manner for example, the supply to a cooking appliance can be disconnected after a short delay, the supply to a heating appliance can be disconnected after a longer delay and the supply to outlet sockets can be disconnected after an even longer delay: this gives an opportunity for the occupier to disable the transducer output and avoid what could be a potentially unnecessary disconnection of the electrical supply to additional appliances or circuits.

The time delay may be set by an external input, such as a time clock, daylight sensor or any other device. For example, it may be that the time delay during the day is set considerably longer than at night.

In the case where a plurality of switching devices are to be controlled by said fault simulation means, said fault simulation means may comprise a plurality of fault simulation devices controlling respective switching devices.

Preferably the transducer(s) and switching device(s) are remote from each other. The transducer(s) may be remote from said fault simulation means, so that the transducer(s) can be mounted on ceilings and walls in a conventional manner and so that the fault simulation means can be located in or adjacent a consumer unit or power distribution panel containing said switching device(s).

The remote transducer or alarm panel may be arranged to transmit said output signal to said fault simulation means via a signal cable, via the mains wiring or via a wireless data link. Alternatively, the fault stimulation means may be arranged to detect an audio signal, such as a bell or sounder, and activate in response thereto.

Also, in accordance with the present invention, there is provided a fault simulation device arranged to control a switching device having fault sensing means for disconnecting a supply from an electrical output thereof when a fault is detected in the supply drawn from said switching device, wherein the fault simulation means comprises an input for receiving or detecting a signal produced by a remotely located transducer and is arranged to simulate a fault in the supply drawn from said electrical output of said switching device when it receives or detects said signal from the remotely located transducer.

Preferably the switching device comprises a residual current device arranged to disconnect the electrical output when an imbalance is detected in the current flowing through first and second terminals of said electrical output, wherein said fault simulation means is arranged to connect a load device between said first terminal and either said second output terminal or earth which creates an imbalance in the current flowing through first and second terminals. The fault simulation device may be located with the switching device or remote from the switching device, at any distance there from.

Preferably the load device comprises a resistor creating an unbalanced load always sufficient to activate the switching device. Typically, the current leakage flow or imbalance required to activate a typical switching device is set by many manufactures to be 100 milliamps or less for a time period of less than half a second. Depending on the supply voltage value, an appropriately sized load resistor is used that will result in at least the required current imbalance for the required time, for the switching device to be activated. To allow a small, low wattage (and therefore inexpensive) resistor to be used as the unbalancing load, and in order to prevent the unbalancing load device/resistor from overheating the unbalancing load device/resistor is preferably only connected for a short predetermined time; typically half a second or less. Preferably the unbalancing load device/resistor is repeatedly pulse, connected for a predetermined time in order to ensure that the switching device senses the fault created by the unbalancing load device/resistor and remains off. Thus, if the switching device is manually switched back on before the output from the transducer has been cancelled, the unbalancing load device/resistor will again be pulse connected across the electrical supply by the fault simulation means causing an imbalance, which, when detected by the switching device, will cause the switching device to disconnect the supply again. Also the pulsed application of the unbalancing load device/resistor means that in the event of the switching device being faulty and not switching off after the application of the unbalancing load device/resistor, heat build-up in the unbalancing load device/resistor is minimal.

BRIEF DESCRIPTION OF THE DRAWINGS

An embodiment of the present invention will now be described by way of an example only and with reference to the accompanying drawings, in which.

DETAILED DESCRIPTION OF THE PREFERRED EMBODIMENTS

Figure 1:
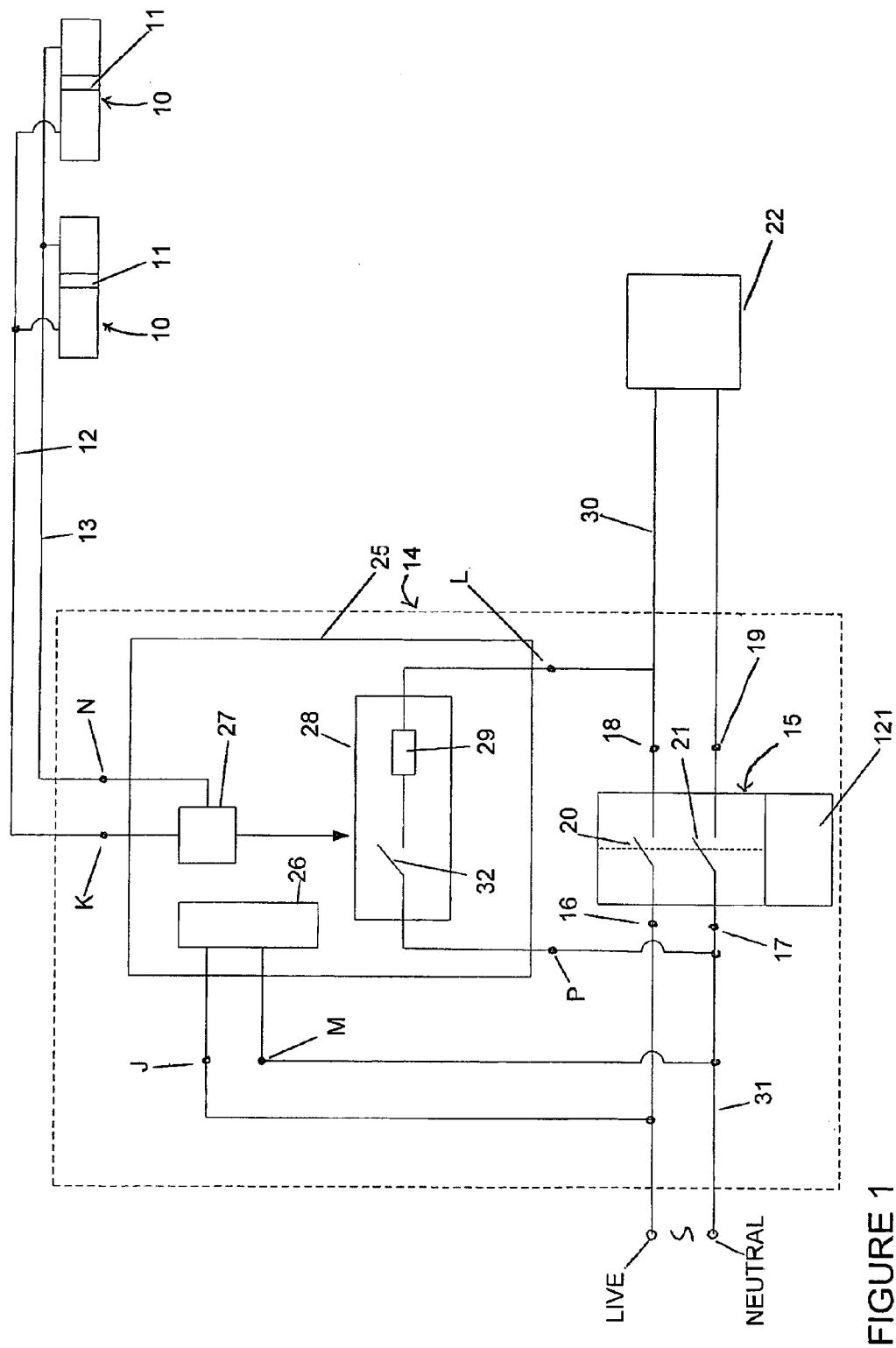
FIG. 1 is a block diagram of a first embodiment of power control apparatus in accordance with the present invention.

Referring to FIG. 1 of the drawings, there is shown a fire prevention apparatus comprising one or more smoke detectors 10 connected across a pair of signal wires 12, 13 extending from a remotely-mounted mains consumer unit 14. Each smoke detector 10 comprises a smoke sensor 11. For convenience the mains electrical supply to the smoke detectors 10 is not shown.

The mains consumer unit 14 comprises one or more residual current devices or so-called RCDs 15 mounted on a rail inside the housing of the mains consumer unit 14. Each RCD 15 comprises a pair of input terminals 16, 17 for respectively connecting to the live and neutral of the mains supply S. Each RCD 15 also comprises a pair of output terminals 18, 19 which are connected to respective input terminals 16, 17 via ganged switches 20, 21. An appliance circuit 22 is connected across the output terminals 18, 19 so that the live and neutral of the mains supply S is applied thereto when the switches 20, 21 of the RCD 15 are closed.

Each RCD 15 comprises a fault sensing circuit 121, which compares the current flow through the output terminals 18, 19 and opens the switches 20, 21 if there is a current imbalance. The value of the current imbalance required is set by each RCD manufacturer, so is the minimum time period, but typically is a current imbalance exceeding 25 milliamps and less than 100 milliamps for a period of over 25 milli seconds. An imbalance exceeding this value indicates the possibility that some current is leaking to earth, or being dissipated in some other manner, and/or that an appliance or the wiring is faulty. The RCD 15 in the consumer unit 14 thus protects against faults and electric shock. A plurality of conventional circuit breakers or so-called MCBs and or other RCD's (not shown) may also be mounted in the mains consumer unit 14 and connected to respective appliance circuits.

Each RCD 15 is controlled by a respective or the same fault simulation device 25 mounted on the rail inside the mains consumer unit 14. The, or each fault simulation device 25 comprises a pair of signal terminals K, N for respectively connecting to the wires 12, 13 extending from the smoke detectors 10. The fault simulation device 25 is powered by a power supply circuit 26 connected via terminals J, M to the live and neutral of the mains electrical supply, which is normally the same supply point at used to supply the smoke detectors 10.

Signal terminals K, N are connected to a trigger circuit 27, which is arranged to detect an alarm signal received from one of the detectors 10 via the wires 12, 13 when smoke is detected. The trigger circuit 27 is arranged to apply a pulsed output signal to a control circuit 28 when the alarm signal is received. The output signal of the trigger circuit 27 may be generated immediately upon receipt of the alarm signal or after a predetermined time delay, which may be set by the installer.

The control circuit comprises a first terminal L for connecting to the live output wire 30 extending from the RCD terminal 18 to the appliance circuit 22. The control circuit 28 also comprises a second terminal P for connecting to the neutral input wire 31 extending into the RCD input terminal 17.

The control circuit 28 comprises a load 29 connected in series with a normally-open switch 32 between the terminals L, P thereof. Upon receipt of the pulsed output signal from the trigger circuit 27, the control circuit 28 is arranged to correspondingly close the switch 32 to intermittently connect the load 29 between the terminals L, P: the mains current flowing from the output terminal 18 thus returns to the input terminal 17 and therefore bypasses the output terminal 19 creating an imbalance in the current leaving terminal 18 and the current returning to terminal 19. This imbalance is detected by the RCD 15 whereupon the switches 20, 21 thereof open to disconnect the appliance circuit 22 from the mains supply S. A visual indicator (not shown) may be provided on the fault simulation device 25 to indicate to a user that the RCD 15 has actuated as a result of the fault simulation device receiving or detecting an activation signal from a remotely located smoke detector(s).

The smoke detectors 10 and the fault simulation device 25 are not powered via the same RCD 15 such that they remain powered when the RCD 15 has actuated. Preferably, the mains consumer unit 14 also feeds lighting circuits which are connected via separate switching devices, such as MCBs or RCD's, which are not actuated when smoke is detected, so that the lights are not turned off.

Smoke detector(s) 10 could be replaced by any suitable transducer operable to detect a given phenomena (an exemplary list might include sound, light, vibration/movement, gases such as carbon monoxide and/or carbon dioxide, but the invention is not limited in this respect) and to generate a signal in response to detecting the parameter. The fault simulation device 25 would react to a signal received from a transducer in a similar manner as outlined above in relation to detecting the signal generated by the smoke detector.

Typically, many gas appliances are required by law to have a gas shut-off valve that automatically shuts off the gas supply to the appliance if the flame is extinguished (for example, if the pilot light on a boiler goes out). Typically, these shut-off valves are operated in response to an electrical signal from a pilot light heat detector. Interrupting this signal with a relay supplied by the switching device, would allow the gas appliance to be controlled by the fault simulation device in a similar manner as described above in relation to electrical appliances. Using a Carbon Monoxide (or Carbon Dioxide) detector(s) in place of the smoke detectors 10 described in FIG. 1, would allow the fault simulation device 25 to be activated upon the detection of Carbon Monoxide or Carbon Dioxide gas. The fault simulation device 25, when activated, would cause RCD 15 to trip thus removing power from the appliance circuit 22. Removing the power from the appliance circuit 22 could be arranged to automatically operate a gas shut-off valve of a gas appliance as described above. Thus, rather than the gas shut-off valve being operated only when a gas leak or "flame-out" event is detected, through this arrangement, the gas supply to the appliance could additionally be shut off in response to detecting Carbon Monoxide and/or Carbon Dioxide (which are products of combustion and thus could both be produced even though there is no gas leak).

The fault simulation device 25 could incorporate a monitoring and timing circuit (not shown in FIG. 1) which delays the activation of the fault simulation device 25 for a predetermined period after the signal generated by the transducer (or smoke detector as illustrated in FIG. 1) is detected by the fault simulation device 25. Upon receiving a signal from the transducer, the timing circuit is activated. Upon expiry of the predetermined period, if the fault simulation device 25 is still receiving a signal from the transducer, it will activate in the manner outlined above i.e. place load 29 across terminals L and P of RCD 0.15 thus causing an imbalance which, detected by the RCD 15, causes it to trip. This would allow the testing of the transducers without triggering the fault simulation device 25, provided that the duration of the test is less than the predetermined period so that the transducer is not generating signals when the predetermined period expires.

The predetermined period may be set by an external input, such as a time clock, daylight sensor or any other device. For example, it may be that the predetermined period during the day is set considerably longer than at night; 60 second period for the day but only 5 seconds at night, for example.

The fault simulation means can incorporate a remote control receiver and control circuitry that is operable to over-ride or reset the fault simulation means such that it does not continue to actuate even though the triggering event may still be occurring. Preferably, this remote control receiver and control circuitry would be controlled by a user controllable remote transmitter like a key fob or such like so that the user can deactivate or reset the fault simulation device remotely even though the triggering event may still be occurring.

Fault simulation device 25 may have additional output pairs like P & L. These pairs would be used to activate other RCD's in the same distribution board in the same manner as previously described. These additional RCD's may be activated at different time intervals. Thus creating a stepped shut down of the entire building with the exclusion of the lighting circuits.

Figure 2:
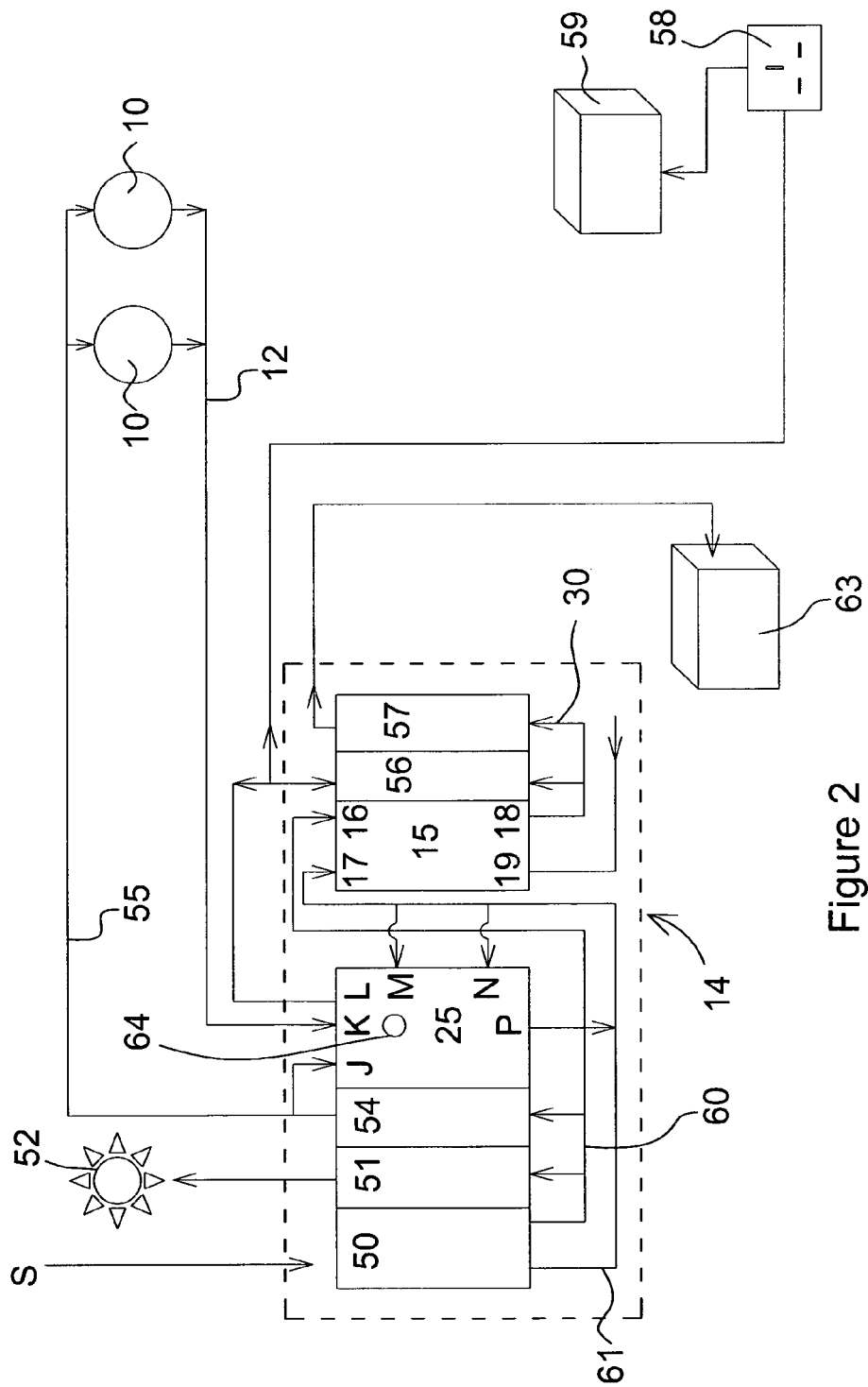
FIG. 2 is a block diagram of a second embodiment of power control apparatus in accordance with the present invention.

Referring to FIG. 2 of the drawings, there is shown a conventional domestic wiring circuit incorporating the fire prevention apparatus of FIG. 1 and like parts are given like reference numerals. The mains neutral circuit is largely omitted from the Figure for clarity. The incoming mains supply S is connected to a circuit breaker 50 disposed in the mains consumer unit 14. The switched live output 60 of the circuit breaker 50 is connected to a miniature circuit breaker or so-called MCB 51, arranged to disconnect its electrical input from its electrical output when an excessive current is being drawn from the output. The live output of the MCB 51 is connected to one or more lighting circuits 52.

The switched live output 60 of the circuit breaker 50 is also connected to another MCB 54 having a live output connected to the smoke detectors 10 by a wire 55. The live output of the MCB 54 is also connected to the live supply terminal J of the fault simulation device 25. The switched neutral output 61 of the circuit breaker 50 is connected to the neutral supply terminal M of the fault simulation device 25. The return signal terminal N of the fault simulation device 25 is also connected to the switched neutral output 61 of the circuit breaker 50.

The input terminals 16,17 of the RCD 15 are respectively connecting to the switched live and neutral outputs 60,61 of the circuit breaker 50. The live output terminal 18 of the RCD 15 is connected via wire 30 to parallel MCBs 56,57. The live output of MCB 56 is connected to one or more power sockets 58 which feed various appliances such as a television 59. The live output of MCB 56 is also connected to one of the load terminals L of the fault simulation device 25. The other load terminal P of the fault simulation device 25 is connected to the switched neutral output 61 of the circuit breaker 50. The live output of MCB 57 is connected to a cooker 63 or other fixed appliance such as a heater or refrigerator. The mains consumer unit 14 could be considerably larger with many more MCBs.

The RCD 15 in the consumer unit 14 protects against faults and electric shock by comparing the amount of current flowing through its live output terminal 18, with the amount flowing through its neutral output terminal 19 as hereinbefore described. When the cooker 63 or an item on it starts to overheat and creates smoke, the smoke is detected by a smoke detector 10. The activated detector 10 then sends a low voltage signal on wire 12 to the other smoke detector(s), so that all detectors 10 emit an audible warning signal. The activated detector 10 also sends a signal to the signal terminal K of the fault simulation device 25.

Upon receiving or detecting a signal from a remotely located transducer (e.g. smoke detector(s)), the fault simulation device 25 will instantly (or after a predetermined period of time), connect the load 29 shown in FIG. 1 between the terminals L and P: the mains current flowing from the output terminal 18 through the MCB 56 thus returns directly to the switched neutral output 61 of the circuit breaker 50: the current therefore by-passes the output terminal 19 creating an imbalance in the current flow between output terminals 18,19. This imbalance is detected by the RCD 15 whereupon the switches 20,21 thereof open to disconnect the sockets 58 and appliance 63 from the mains supply S. A visual indicator LED 64 is provided on the fault simulation device 25 to indicate to a user that the RCD 15 has actuated as a result of smoke being detected. This LED 64 stays illuminated after the smoke detectors 10 stop sounding. The RCD 15 comprises a manual actuator (not shown) which can be actuated to close the switches 20, 21 to reconnect the sockets 58 and appliance 63 to the mains supply S. If this is done the supply is again applied via the MCB 56 to terminal L of the fault simulation device 25 and this extinguishes the LED 64.

Figure 3:
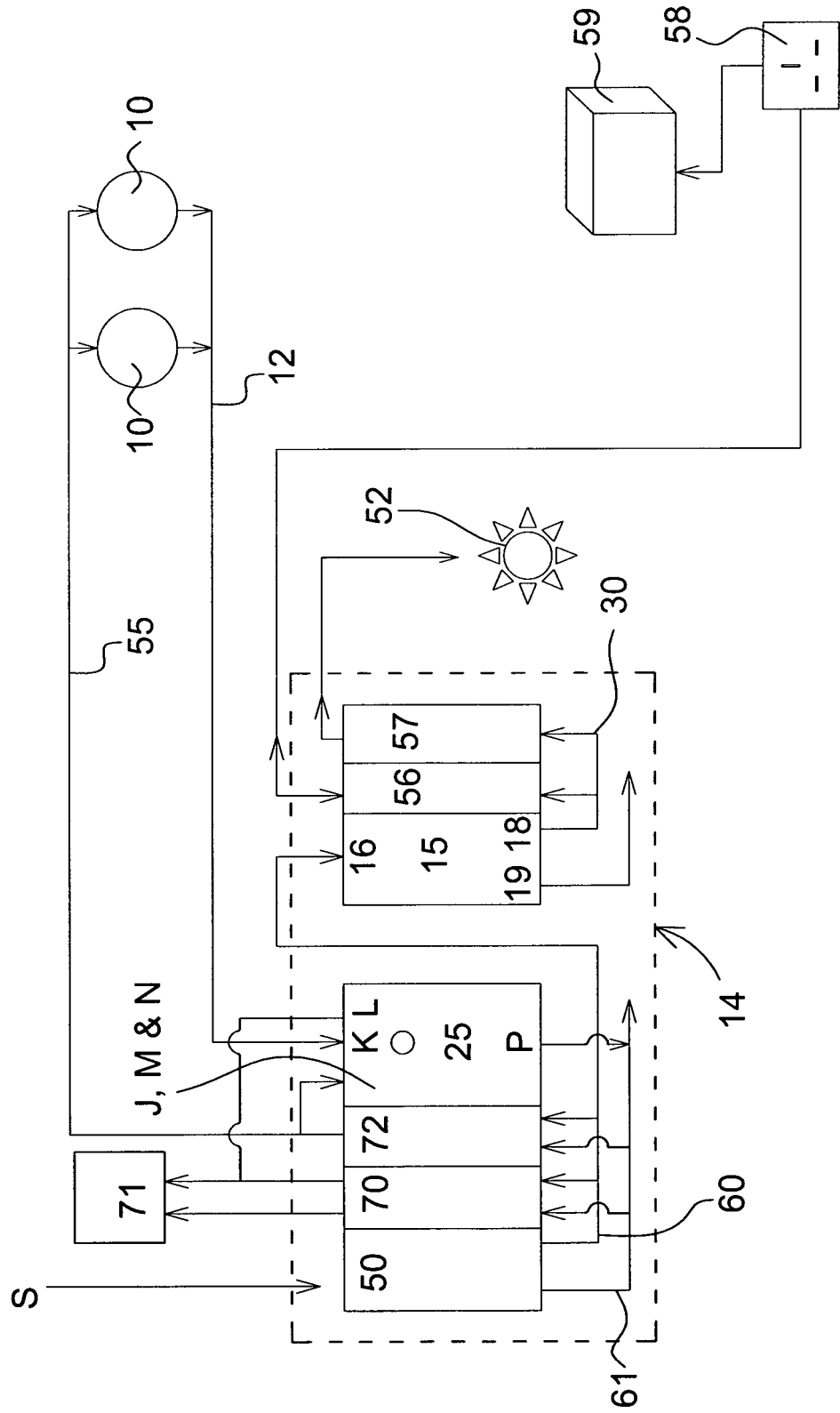
FIG. 3 is a block diagram of a third embodiment of power control apparatus in accordance with the present invention.

Referring to FIG. 3 of the drawings, there is shown an alternative conventional domestic wiring circuit incorporating the fire prevention apparatus of FIG. 1 and like parts are given like reference numerals. The mains neutral circuit is largely omitted from the Figure for clarity. The incoming mains supply S is connected to a circuit breaker 50 in the mains consumer unit 14. The switched live and neutral output 60,61 of the circuit breaker 50 supplies live and neutral to a residual circuit breaker with over current protection, or so-called RCBO 70. The switched live and neutral output of the RCBO is connected to a cooker 71 and to one of the load terminals L of the fault simulation device 25.

The switched live output 60 of the circuit breaker 50 is connected to an RCBO 72 which exclusively supplies the smoke detectors 10 with live and neutral by the cable 55. The live output 60 is also supplied to the power terminal J of the fault simulation device 25. The neutral output 61 is applied to the power terminal M and the return signal terminal N of the fault simulation device 25. The other load terminal P of the fault simulation device 25 is also connected to the neutral output 61.

The switched live output 60 of the circuit breaker 50 is also connected to an RCD 15, which in turn supplies MCBs 56,57 via wire 30. The live output of MCB 56 is connected to one or more power sockets 58 which feed various appliances such as a television 59. The live output of MCB 57 is connected to a lighting circuit 52. The switched neutral output 61 is shown not connected for clarity, but is connected directly to the neutral returns from all the MCBs.

The RCD 15 and RCBOs 70,72 in the consumer unit 14 protect against faults and electric shock by comparing the value of the live current with the neutral current. When an imbalance is detected, the RCBO switches off the supply in the same manner as the RCD 15 described in relation to FIG. 1.

When the cooker 71 or an item on it starts to overheat and creates smoke, the smoke is detected by a smoke detector 10. The activated detector 10 then sends a low voltage signal on wire 12 to the other smoke detector(s), so that all detectors 10 emit an audible warning signal. The activated detector 10 also sends a signal to the signal terminal K of the fault simulation device 25.

Upon receiving a signal, the fault simulation device 25 will instantly (or after a predetermined period of time), repeatedly connect and then disconnect the load 29 shown in FIG. 1 between the terminals L and P for short periods of time: the mains current flowing from the live output terminal of the RCBO 70 thus returns directly to the switched neutral output 61 of the circuit breaker 50: the current therefore bypasses the neutral output terminal of the RCBO 70 creating an imbalance in the current flow between its output terminals. This imbalance is detected by the RCBO 70 whereupon the switches inside the RCBO 70 open to disconnect the mains supply from the smoking cooker 71. A visual indicator LED 64 is provided on the fault simulation device 25 to indicate to a user that the RCBO 70 has actuated as a result of smoke being detected. This LED 64 stays illuminated after the smoke detectors 10 stop sounding. The RCBO 70 comprises a manual actuator (not shown) which can be actuated to close the switches to reconnect the cooker 71 to the mains supply S. The supply is again applied to terminal L of the fault simulation device 25 and this extinguishes the LED 64.

Although FIGS. 2 and 3 have been described with reference to smoke detectors, again these could be replaced by any suitable transducer operable to detect a given phenomena (an exemplary list might include sound, light, vibration/movement, gases such as carbon monoxide and/or carbon dioxide, but the invention is not limited in this respect) and to generate a signal in response to detecting the parameter. The fault simulation device 25 would react to a signal received or detected from a transducer in a similar manner as outlined above in relation to detecting the signal generated by the smoke detector(s). The fault simulation device 25 would react to a signal received from an alarm panel in a similar manner as outlined above in relation to detecting the signal generated by the smoke detector(s)

Again, if a Carbon Monoxide (or Carbon Dioxide) detector(s) is used in place of, or as well as, the smoke detectors 10 described, the fault simulation device 25 could be activated upon the detection of Carbon Monoxide or Carbon Dioxide gas. Consequently, the activation of the fault simulation device 25, and subsequent tripping of one or more RCDs, or RCBOs could be arranged to automatically operate a gas shut-off valve of a gas appliance as well as shut off electrical power to various appliances.

Additionally, the fault simulation device 25 could incorporate a monitoring and timing circuit to delay the activation of the fault simulation device 25 for a predetermined period after the signal generated by the transducer (or smoke detector as illustrated in FIG. 1) is detected by the fault simulation device 25. Upon receiving or detecting a signal from the transducer, the timing circuit is activated. Upon expiry of the predetermined period, if the fault simulation device 25 is still receiving or detecting a signal from the transducer, it will activate in the manner outlined above i.e. place load 29 across the terminals of the selected RCD or RCBO thus causing an imbalance which, detected by the RCD or RCBO, causes it to trip.

The predetermined period may be set by an external input, such as a time clock, daylight sensor or any other device. For example, it may be that the predetermined period during the day is set considerably longer than at night; 60 second period for the day but only 5 seconds at night, for example.

The power sockets 58 and fixed appliances could each be supplied by their own RCBO or RCD. Each RCBO/RCD would be operated by the fault simulation device 25 having several independent load terminals L. This would allow the fault simulation device 25 to remove power simultaneously/or at different times from different circuits by applying one or more loads simultaneously or at different times across the independent load terminals L and the P terminal, causing the respective RCBO/RCDs to detect the imbalance so caused in their power supply lines and trip out removing power from the appliance connected to them. Alternatively, the fault simulation device 25, in conjunction with the timer circuit described above, could apply a load, at various time intervals, across selected ones of the independent load terminals and terminal P. This would allow the selective isolation of various appliances at varying time intervals. For example, if a transducer is activated, the fault simulation device 25 may not activate immediately (this initial delay could allow for testing of transducers as outlined above). If the transducer is still activated after a first predetermined period of time then the fault simulation device 25 may place a load across terminal P and a first independent load terminal. This causes an imbalance in a first RCBO/RCD connected to a cooker and thus the RCBO/RCD will trip and isolate the power supply to the cooker. If the transducer is still activated after a second predetermined period, which typically would be greater than the first predetermined period, then the fault simulation device 25 may place a load across terminal P and a second independent load terminal. This causes an imbalance in a second RCBO/RCD connected to power sockets and thus the RCBO/RCD will trip and isolate the power supply to the power sockets.

Alternatively, the power sockets 58 and fixed appliances could each be supplied by their own RCBO or RCD. Each RCBO/RCD would be operated by a different fault simulation device, each receiving the same signal from the smoke detectors 10 on terminal K at the same time. Each fault simulation device has a different built in time delay, so for example that after one minute of continual activation of the smoke alarms 10, the cooker 71 has its supply disconnected. After three minutes of continual activation of the smoke alarms 10, the heating system has its supply disconnected. After five minutes of continual activation of the smoke alarms 10, the power sockets 58 have their supply disconnected. This gives the occupier(s) the chance to address the issue of the smoke alarms activating and perhaps reset them, before the supply to the entire building is disconnected.

Figure 4:
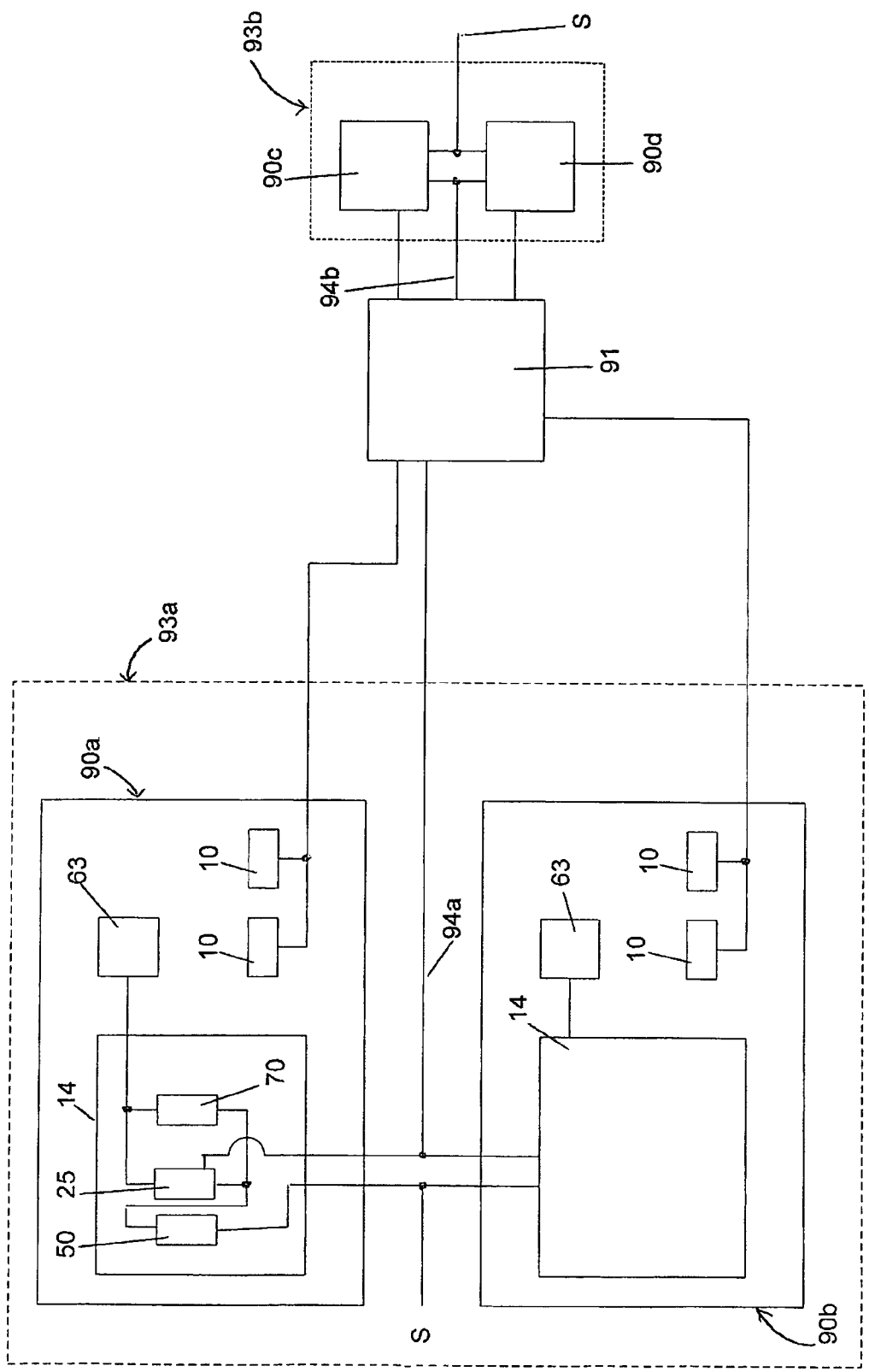
FIG. 4 is a block diagram of a fourth embodiment of power control apparatus in accordance with the present invention.

Referring to FIG. 4 of the drawings, there is shown a wiring circuit for a hotel, hostel, apartment block or other commercial environment incorporating the fire prevention apparatus of FIG. 1 and like parts are given like reference numerals. The mains neutral circuit is largely omitted from the Figure for clarity. Each room or for example, room 90 in the building comprises smoke detectors 10 connected to a remotely located central control panel 91 of a central fire alarm system. The system is divided into zones 93, each zone perhaps corresponding to the floors in the building or to individual rooms or units 90. Each hotel room or unit 90 comprises a mains consumer unit 14 connected to the mains supply S. Each mains consumer unit 14 incorporates a fault simulation device 25 connected to an RCBO 70 that feeds a cooker 63.

When a detector 10 in one room or' unit 90 detects smoke, the control panel 91 sends a low voltage control signal to the signal terminals N, K of all fault simulation devices 25 of all rooms or units 90 in that zone e.g. 93*a* via cable 94*a*. Upon receiving the signal from the control panel 91, the fault simulation devices 25 will instantly (or after a predetermined period of time), repeatedly simulate a fault in the supply drawn through the RCBO 70 so that the RCBO 70 actuates to disconnect the cooker 63 from the supply S. In instances where a gas cooker is utilised, the RCBO 70 may be connected to a gas control valve which closes when the supply is disconnected.

Additional fault simulation devices and RCDs or RCBOs could be added to each room or unit 90 to isolate other fixed appliances and sockets upon detection of heat or smoke, either instantly or after predetermined delays. The delay may vary according to the appliances being protected and the control panel may have outputs which send control signals at relevant times to the fault simulation devices of the appliances being protected. Thus, if the control panel is reset within say five minutes, the power sockets are not isolated and minimum disruption is caused to the occupants of other rooms or units 90.

In an alternative embodiment for use in hotels, each room 90 has its own small mains consumer unit 14. The fault simulation devices 25 receive their instruction using a unique identifying address code. When a detector 10 (which also has a unique identifying address), in one room or unit 90 detects smoke, e.g. 90*a*, it sends an identifying signal to the control panel 91 this then sends a coded control signal via cable 94*a* (which could be the same cable as the detector 10 is on) to the fault simulation device 25 located in the room 90*a* where fire is detected and or to all fault simulation devices 25 of rooms e.g. 90*a*, 90*b* in that zone 93*a*. The or each fault simulation device 25 would then trip the RCB/RCBO 70 supplying all power to the respective room 90, whilst leaving the supply to the lighting on. If the rooms 90 are self-catering accommodation and are provided with a cooker, it may be appropriate to have two fault simulation devices 25.

Upon receiving a signal from the control panel 91, one fault simulation device 25 instantly trips the RCB/RCBO 70 supplying the cooker. If the alarm is not reset, the other fault simulation device 25 then receives a signal from the control panel 91 (say five minutes later) to trips out the RCB/RCBO supplying the remaining power to the accommodation. Thus at the instant the fire alarm is activated, all of the cookers in the detected zone are isolated. If the activation of the fire alarm continues for e.g. five minutes, all other power sources excluding lighting are isolated. An additional advantage of this system is that it gives the management of the building the ability to remotely disconnect appliances and power points. In the event of a disturbance in room 90, a simple keypad at reception could be used to send an addressed instruction(s) to the fault simulation device in room 90 to turn the power sources off excluding lights in room 90.

Although FIG. 4 has been described with reference to smoke detectors, again these could be replaced by any suitable transducer operable to detect a given phenomena (an exemplary list might include sound, light, vibration/movement, gases such as carbon monoxide and/or carbon dioxide, but the invention is not limited in this respect) and to generate a signal in response to detecting the parameter. The transducer(s) would supply its signal to the control panel 91 in the same manner as the smoke detectors 10 and the fault simulation device 25 would react to a signal received from the control panel in the same manner as outlined above.

In a pure commercial environment, shop, store, office block, factory or public entertainment arena etc, a fault simulation device with an RCB/RCBO could be used with an appropriately zoned fire alarm, to isolate complete floors, kitchens, departments or individual appliances such as drinks chillers, cookers, fans, computers, heating units etc.

The aforementioned examples have been described with reference to the fault simulation device being activated upon receiving an electrical alarm signal from an activated smoke detector/transducer. In an alternative embodiment, the fault simulation means could incorporate a detector that is able to detect acoustic signals, where the fault simulation means would activate upon detecting the acoustic signals. In this way, for example, the fault simulation means would be located remotely away from the switching device (e.g. the switching device might be located on the main distribution panel whilst the fault simulation device might be located at the wall power socket for a particular appliance). In this scenario, if a smoke alarm or other transducer were to be activated and thus start making noise, the acoustic signals would be detected by the detector in the fault simulation means which would activate to cause a current imbalance in the electrical supply to the appliance(s). This imbalance would be detected by the switching device which would switch off power to the appliance(s). Thus the fault simulation means could be activated without having to be wired to the smoke alarm/transducer. The skilled person will appreciate that any type of detector could be used in the above example provided that the triggering transducer emitted or produced a signal or phenomena that the detector was adapted to detect.

The aforementioned examples have been described with reference to fire prevention, however, the skilled person will appreciate that by substituting the smoke detectors/transducers described with a user operable button, the fault simulation device 25 can be activated in response to the signal from the button. In this way it can be operated such that it causes a plurality of RCBOs/RCDs to trip out simultaneously thus isolating power to any electrical appliance that they are respectively attached to. Thus the skilled person will immediately comprehend that the fault simulation device could be used to turn on and off power to banks of individual electrical appliances simultaneously. Thus, in an industrial setting for example, the user operable button could be an emergency stop switch which, when pushed, causes the power supply to all the electrical appliances in factory to be shut-off via the fault simulation device 25 causing the RCBOs/RCDs attached to respective ones of the appliances to trip simultaneously.

It will be appreciated that the power control apparatus in accordance with the present invention is relatively simple and inexpensive in construction yet is able to reliably disconnect one or more electrical appliances from the mains supply in the event that certain detection parameters are detected. It will also be appreciated that the power control apparatus in accordance with the present invention provides a simple, inexpensive, and efficient way of controlling power to a large number of electrical appliances simultaneously.

The invention claimed is:

1. A power control apparatus comprising:
a transducer operable to detect a predefined parameter and generate an activation signal in response to said detection;
a switching device comprising an electrical input for connecting to an electrical supply, an electrical output for connecting to one or more electrical appliances, a switch connected between said electrical input and said electrical output, and fault sensing means arranged to actuate the switch to disconnect the electrical input from the electrical output when a fault is detected in the electrical supply drawn from the switching device by said appliance(s) from said electrical output; and fault simulation means, remote from said transducer, arranged to simulate a fault in the supply drawn from said electrical output of said switching device in response to receiving said activation signal from said transducer, so as to actuate the switch to disconnect the electrical input from the electrical output;

wherein said fault simulation means is arranged to simulate a fault in the supply drawn from said electrical output of said switching device, the fault occurring a predetermined time period after initially receiving said activation signal in the event that said activation signal is still being received.

2. A power control apparatus as claimed in claim 1, in which said transducer is a switch and wherein activation of said switch causes the generation of said activation signal.

3. A power control apparatus as claimed in claim 1, in which said predefined parameter is selected from the group including heat, smoke, carbon monoxide, and carbon dioxide.

4. A power control apparatus as claimed in claim 3, in which said activation signal is an acoustic signal and wherein said fault simulation means further comprises a sensor operable to detect said acoustic signal, wherein said fault simulation means is arranged to simulate said fault in said supply in response to said sensor detecting said acoustic signal.

5. A power control apparatus as claimed in claim 1, in which the switching device further comprises a mains circuit breaker arranged to disconnect the electrical input from the electrical output.

6. A power control apparatus as claimed in claim 1, in which the switching device further comprises a residual current device arranged to disconnect the electrical input from the electrical output when an imbalance is detected in the current flowing along a pair of wires across which the or each appliance is connected.

7. A power control apparatus as claimed in claim 1, in which the electrical input of the switching device comprises first and second input terminals respectively connected to first and second output terminals of the electrical output, said switch being disposed between the first input terminal and the first output terminal, and wherein said fault simulation means is arranged to connect a load between the first output terminal and the second input terminal or between the second output terminal and the first input terminal.

8. A power control apparatus as claimed in claim 7, in which the first and second input terminals are respectively arranged for connecting to the live and neutral of a mains supply.

9. A power control apparatus as claimed in claim 1, in which the transducer is arranged to produce an audible output signal when operated.

10. A power control apparatus as claimed in claim 1, comprising means for setting the time period.

11. A power control apparatus as claimed in claim 10, wherein said means for setting the time period comprises a device selected from the group including a clock, a timer switch, and a daylight sensor.

12. A power control apparatus as claimed in claim 1, in which the switching device and the fault simulation means are separate and are mounted inside a unit arranged to distribute an electrical supply to one or more appliance circuits via respective switching devices.

13. A power control apparatus as claimed in claim 12, comprising a plurality of switching devices mounted inside said unit feeding respective appliance circuits, said fault simulation means being arranged to simulate a fault in the supply drawn from the electrical output of at least one of said switching devices.

14. A power control apparatus as claimed in claim 13, in which said fault simulation means is arranged to simulate a plurality of faults in the supply drawn from the respective electrical outputs of each switching device, the plurality of faults occurring at different predetermined time periods after said transducer is operated.

15. A power control apparatus as claimed in claim 13, in which each one of said plurality of switching devices is controlled by a respective fault simulation device.

16. A power control apparatus as claimed in claim 1, in which the transducer is arranged to transmit said activation signal to said fault simulation means via a signaling interface comprising one of a signal cable, a modulated signal on the mains wiring, a wireless data link, and an audio signal.

17. A power control apparatus as claimed in claim 1, in which said fault simulation means is arranged to simulate a fault in the supply drawn from said electrical output of said switching device upon receipt of an activation signal from said transducer or from a control unit to which said transducer is connected.

18. A power control apparatus as claimed in claim 17, in which said fault simulation means is addressable by an address control signal supplied thereto and is arranged to simulate a fault in the supply drawn from said electrical output of said switching device upon receipt of an addressed control signal from said transducer or from a control unit to which said transducer is connected, via a signaling interface comprising one of a signal cable, a modulated signal on the mains wiring, and a wireless data link.

19. A power control apparatus as claimed in claim 1, in which one or more gas control valves are connected to the electrical output(s) of said switching device, where said one or more gas control valves are operable to shut off gas supply to said one or more electrical appliances when said switching device disconnects the electrical input from the electrical output.

20. A power control apparatus as claimed in claim 1, wherein said fault simulation means further comprises control means operable to receive an external control signal wherein, in response to receiving said external control signal, said fault simulation means is arranged to either:

disregard the activation signal from said transducer if it is not already receiving said activation signal, such that it does not simulate a fault in the supply if it subsequently receives said activation signal; or cease to simulate a fault on the supply if it is already receiving the activation signal.

21. A power control apparatus as claimed in claim 20, wherein said external control signal contains a unique address or otherwise and is received via a signaling interface comprising one of a signal cable, a modulated signal on the mains wiring, and a wireless RF link.

22. A fault simulation device arranged to control a switching device having fault sensing means for disconnecting a supply from an electrical output thereof when a fault is detected in the supply drawn by an appliance from said electrical output, wherein the fault simulation device comprises an input for receiving or detecting an alarm signal and means for simulating a fault in the supply drawn from the electrical output of the switching device when said alarm signal is received or detected;

wherein the means for simulating a fault is arranged to simulate a fault in the supply drawn from the electrical output of the switching device the fault occurring a predetermined time period after initially receiving said alarm signal in the event that said alarm signal is still being received.

23. A fault simulation device as claimed in claim 22, in which the switching device comprises a residual current device arranged to disconnect the electrical output when an imbalance is detected in the current flowing through first and second terminals of said electrical output across which the appliance is connected, wherein said fault simulation means is arranged to connect a load device to said first terminal which creates a current flow path to a point remote from said second output terminal.

24. A fault simulation device as claimed in claim 23, in which the load device comprises a resistor.

25. A fault simulation device as claimed in claim 24, in which the load device is only connected for a predetermined time to create said current flow path to said point remote from said second output terminal.

\* \* \* \* \*